United States Patent

[11] 3,631,626

[72] Inventor Francis P. Keenan
1623 Montrose Drive, Tyler, Tex. 75701
[21] Appl. No. 31,611
[22] Filed Apr. 24, 1970
[45] Patented Jan. 4, 1972

[54] GROOVED FISHING LURE
3 Claims, 6 Drawing Figs.
[52] U.S. Cl. .................................................. 43/42.24,
43/42.34
[51] Int. Cl. .............................................. A01k 87/04
[50] Field of Search ........................................... 43/42.24,
42.34, 42.33, 175

[56] References Cited
UNITED STATES PATENTS
2,979,850 4/1961 Lund ........................... 43/42.24
3,148,474 9/1964 Smith .......................... 43/42.24
2,599,035 6/1952 Wing ........................... 43/42.33
2,241,941 5/1941 Bates ........................... 43/42.33

Primary Examiner—Melvin D. Rein
Attorney—Arthur M. Sloan

ABSTRACT: An improved fishing lure of the elongated plastic or rubber wiggle type. The lures which are flexible, soft, and resilient are molded or cut with grooves at an angle or pitch within the range of 3° to 80° from a horizontal plane. The angled grooves give increased strength to the lure as a result of greater cross-sectional area. The angled grooves having a spiral configuration create a turbulence in the water as the lure is moved which attracts the attention of the fish it is desired to catch. The angled grooves of translucent or transparent lures according to the invention results in increased refraction and reflection of light as the lure is moved through the water with resultant attraction of fish.

PATENTED JAN 4 1972    3,631,626

INVENTOR
FRANCIS P. KEENAN

Arthur M. Sloan

ATTORNEY

GROOVED FISHING LURE

This invention relates to an improved fishing lure.

The fishing lure of the subject invention may be made of a suitable plastic substance, a rubber compound, or any other appropriate soft material that is elastic, flexible, and resilient and which can be molded into the desired shapes.

Commonly the lures are in the shape of worms or snakes.

Prior art lures have contained grooves or indentations molded or cut vertically or at substantially 90° to a horizontal plane running along the length of the elongated lure. In prior art lures there have been slight unintentional inclinations of the grooves or indentations of a few degrees; however, with the slight unintentional inclination of the grooves sometimes occuring in prior art lures the grooves have still been substantially vertical or at right angles to the horizontal plane running along the length of the elongated lure.

One of the disadvantages of the prior art lures has been their susceptibility to tearing or breaking along the grooves or indentations on stretching or twisting of the lure. As a result, prior art lures frequently tear along the grooves or indentations and are lost or ruined with concomitant loss of fish. This results in increased expense and aggravation to the fisherman.

In addition prior art lures of the plastic wiggle type with substantially vertical grooves or indentations create no particular turbulence or illusion of movement when they are twisted, twitched, or moved through the water.

Neither do prior art fishing lures of the plastic wiggle type with substantially vertical indentations or grooves produce any refractive or reflective optical effects to attract the fish which it is desired to catch.

It has been found that if the fishing lures are manufactured with grooves or indentations inclined at an angle of more than 3° but less than 80° from the horizontal plane running along the length of the elongated fishing lure, then there is much less likelihood that the lure will tear along the indentation or groove. This is because the lures of the subject invention have a greater cross-sectional area along the grooves or indentations. This results in less lost lures and and greater lure life.

Lures of the subject invention having inclined or diagonal grooves or indentations at an angle of 3° to 80° from the horizontal plane have a spiral appearance. It has been found that when the lures of the subject invention are twisted or twitched slightly or pulled through the water the spiral appearance gives the illusion of movement and the inclined grooves actually produce a revolving or twisting of the lure. This illusion of movement has been found to attract fish. Prior art lures with vertical grooves or indentations lack the illusion of movement and are less likely to attract fish. Needless to say, the purpose of any lure is to lure or attract fish.

In addition, the diagonal or inclined "spiral" indentations or grooves of the lures of the subject invention create a slight turbulence as they are moved through the water or slightly twisted or twitched in the water. This turbulence which does not occur with prior art lures further attracts the fish which it is desired to catch. This turbulence resulting in vibrations through the water which attracts fish is a direct result of the water moving along the inclined grooves or spiral configuration of the lures of the subject invention.

Fishing lures of the plastic wiggle type such as those of the subject invention may be molded or otherwise constructed of an opaque material or of a translucent or transparent material. In some instances lures constructed of a translucent or transparent material have been shown to be more effective in attracting fish. In prior art plastic wiggle-type lures constructed of translucent or transparent material with vertical grooves or indentations, no particular reflective or refractive effects have been found to occur. In the lures of the subject invention with the inclined or diagonal grooves at an angle of 3° to 80° from the horizontal plane, a very evident refractive and reflective optical effect occurs. This not only further enhances the illusion or appearance of movement but effectively sends out light signals which are received by the fish. Both the illusion of movement and the reflective light produced by the lures of the subject invention act to attract fish. As noted these effects are not available in prior art plastic-type wiggle lures.

Accordingly it is an object of the subject invention to provide an improved fishing lure.

Another object of the subject invention is to provide an improved fishing lure of the plastic or rubber wiggle type.

Yet another object of the subject invention is to provide an improved fishing lure with inclined or diagonal grooves or indentations molded or cut into the lure at an angle of 3° to 80° from the horizontal plane running along the length of the elongated lure.

A further object of the subject invention is to provide an improved fishing lure which attracts fish to a much higher degree than prior art fishing lures.

An additional object of the subject invention is to provide an improved fishing lure of the plastic or rubber wiggle type with greater strength than prior art lures.

Still another object of the subject invention is to provide an improved fishing lure of the plastic or rubber wiggle type with increased strength along the grooves or indentations.

Yet another object of the subject invention is to provide an improved fishing lure of the plastic or rubber wiggle type which is less likely to tear along the grooves or indentations than prior art devices.

A further object of the subject invention is to provide an improved fishing lure of the plastic or rubber wiggle type having a longer life than prior art devices.

An additional object of the subject invention is to provide an improved fishing lure of the plastic or rubber wiggle type which gives a greater illusion of movement as it is pulled, twisted, or twitched through the water than do prior art fishing lures.

A further object of the subject invention is to provide an improved fishing lure of the plastic or rubber wiggle type which creates a turbulence or vibrations in the water as it is moved through the water or twisted in the water.

Yet another object of the subject invention is to provide an improved fishing lure of the plastic or rubber wiggle type which may be made of transparent or translucent material to create an added optical illusion of movement as the fishing lure is moved through the water or twisted or twitched in the water.

Yet one more object of the subject invention is to provide an improved fishing lure of the plastic or rubber wiggle type which may be constructed of a transparent or translucent material to create refractive and reflective optical qualities which are not available in prior art fishing lures.

Still one more object of the subject invention is to provide an improved fishing lure of the plastic or rubber wiggle type which may be constructed of transparent or translucent material to create reflective optical effects which aid in attracting the fish desired to be caught.

Other object, advantages, and novel features of the subject invention will be apparent from the following description in which.

Figure 1:
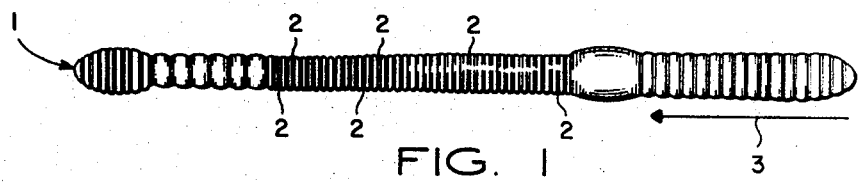
FIG. 1 is a top view of a prior art fishing lure of the plastic or rubber wiggle type.

Referring to the drawings in FIG. 1 a prior art fishing lure of the plastic wiggle type is shown at 1 with vertical grooves or indentations 2 at 90° to the horizontal plane 3 running along the length of the elongated fishing lure 1.

Figure 2:
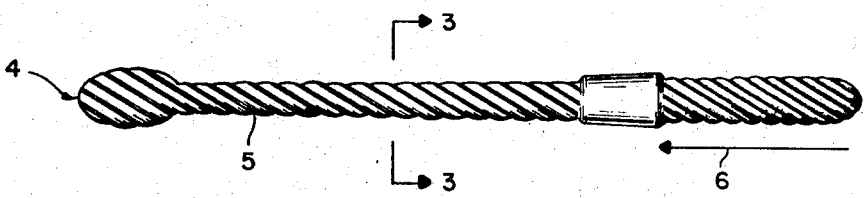
FIG. 2 is a top view of one configuration of a fishing lure according to the subject invention.
Figure 3:
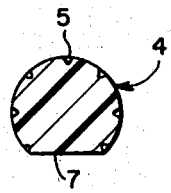
FIG. 3 is a cross-sectional view taken along the lines 3—3 of FIG. 2.

FIGS. 2 and 3 show one configuration of the fishing lure of the subject invention.

FIG. 2 is a left-handed configuration showing lure 4 having grooves or indentations 5 at a pitch or angle of approximately 30° to the horizontal plane 6 running along the length of the elongated fishing lure 4. Naturally, if the angle is measured from the right side rather than the left side of the groove, then it is the supplement of 30°, and the angular range of 3° to 80° stated throughout this application is predicated on angle measurement from that side of the groove giving the smallest angle of inclination.

FIG. 3 is a cross-sectional view of the fishing lure 4 of FIG. 2 taken along the lines 3—3 of FIG. 2 and showing the flattened surface 7 resulting from an open molding process.

Figure 4:
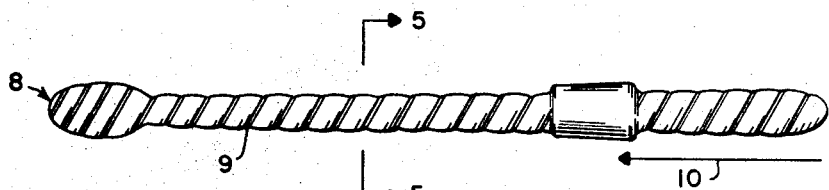
FIG. 4 is a top view of another configuration of a fishing lure according to the subject invention.

FIG. 4 is a right-handed configuration showing lure 8 having grooves or indentations 9 at a pitch or angle of approximately 60° to the horizontal plane 10 running along the length of the elongated fishing lure 8.

Figure 5:
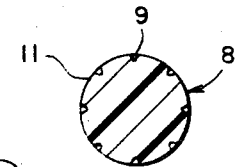
FIG. 5 is a cross-sectional view taken along the lines 5—5 of FIG. 4.

FIG. 5 is a cross-sectional view of the fishing lure of FIG. 4 taken along the lines 5—5 of FIG. 4 and showing the rounded surface 11 resulting from a closed molding process.

Figure 6:
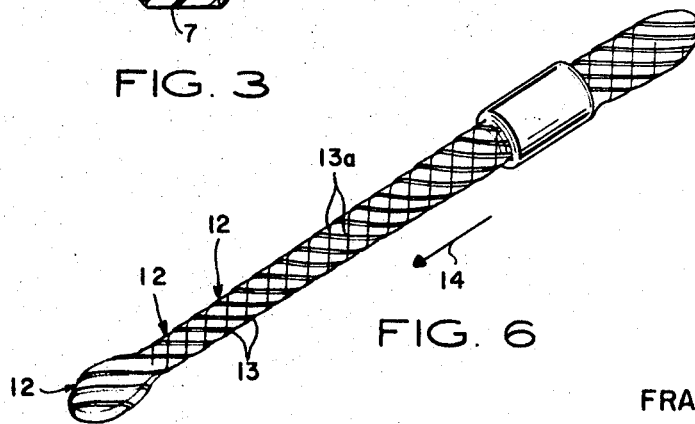
FIG. 6 is a perspective view of a fishing lure according to the subject invention.

FIG. 6 is a perspective view of a translucent fishing lure 12 according to the subject invention having grooves or indentations 13 at an angle of approximately 35° to the horizontal plane 14 running along the length of the elongated fishing lure 12.

As noted, the grooves or indentations of the fishing lure of the subject invention are cut or molded at an angle of from 3° to 80° from the horizontal plane running along the length of the elongated lure.

It can be seen that in every instance the angled grooves of the fishing lures of the subject invention are longer than the vertical grooves of the prior art, and as a result the lures of the subject invention have a greater cross-sectional area of material along the grooves or indentations than do prior art fishing lures. This greater cross-sectional area of material along the grooves gives the fishing lures of the subject invention a greater strength on stretching or twisting thus prolonging the life of the fishing lure and decreasing it's susceptibility to tearing and breaking. Since the prior art lures have their narrowest cross section along the grooves, they invariably tear along the grooves. The lures of the subject invention do not have their narrowest cross section along the grooves and will not tear along the grooves in normal use.

When a prior art lure is stretched, the greatest stress is along the grooves. When a lure of the subject invention is stretched, the stresses are evenly distributed along the elongated length of the lure, thus giving the lure greater strength.

Because of the spiral configuration of the lures of the subject invention, there is no groove opposite any other groove, hence there is uniform cross-sectional area along the grooved length of the lure. In prior art lures every groove has an opposite groove giving the lure weak points along the groove and sections of lesser cross-sectional area along the groove.

Twisting or twitching the "spiral" appearing fishing lure of the subject invention and moving it through the water creates a turbulence thus sending out vibrations to attract the attention of the fish desired to be caught, since a spiral flow of water through the angular grooves causing a revolving or twisting of the lure is induced by motion.

The lines 13a in FIG. 6 indicate the groove pattern productive of refractive and reflective optical effects when the lure of the subject invention is constructed of translucent or transparent material. The groove pattern 13a showing through the translucent or transparent material from one side to the other with the reflective and refractive optical effects gives the further illusion of movement as the lure is twisted or twitched or pulled through the water. The illusion of movement is effective to attract the fish desired to be caught. Likewise the reflection produced by the "spiral" pattern 13a of the grooves shining through the transparent or translucent material from one side to the other aids in attracting the fish to the lure.

The fishing lures of the prior art, having vertical grooves or indentations, when constructed of transparent or translucent material have the grooves on one side cancel out the optical effect of the grooves on the other side giving no "spiral" effect with attendant refractive and reflective properties i.e. in prior art fishing lures the groove on one side is superimposed optically over the groove on the other side cancelling out any "spiral" appearance or reflective or refractive optical effect.

As noted above, the angular grooves of the fishing lure of the subject invention have been found to be much more effective in catching fish with much longer fishing lure life and less possibility of loss of lure through tearing or ripping.

I claim:

1. A fishing lure of the resilient wiggle type formed from a translucent or transparent plastic material and provided with a continuous spiral groove extending along a major portion of the body of the lure, the angle of the groove with respect to a plane extending along the length of the lure being between 3° and 80°, the depth and the configuration of the groove being such as to afford greater strength on stretching or twisting and affording an optical effect giving the illusion of movement.

2. A fishing lure of the resilient wiggle type formed from a translucent or transparent plastic material and provided with spiral grooves extending along a major portion of the body of the lure, the angle of the grooves with respect to a plane extending along the length of the lure being between 3° and 80°, the depth and configuration of the grooves being such as to afford greater strength on stretching or twisting and affording an optical effect giving the illusion of motion.

3. The fishing lure as recited in claim 2, said lure having a flat bottom.